Aug. 1, 1944. H. W. SIMPSON ET AL 2,354,710
MOWER FOR TRACTORS
Filed June 9, 1941 4 Sheets-Sheet 4
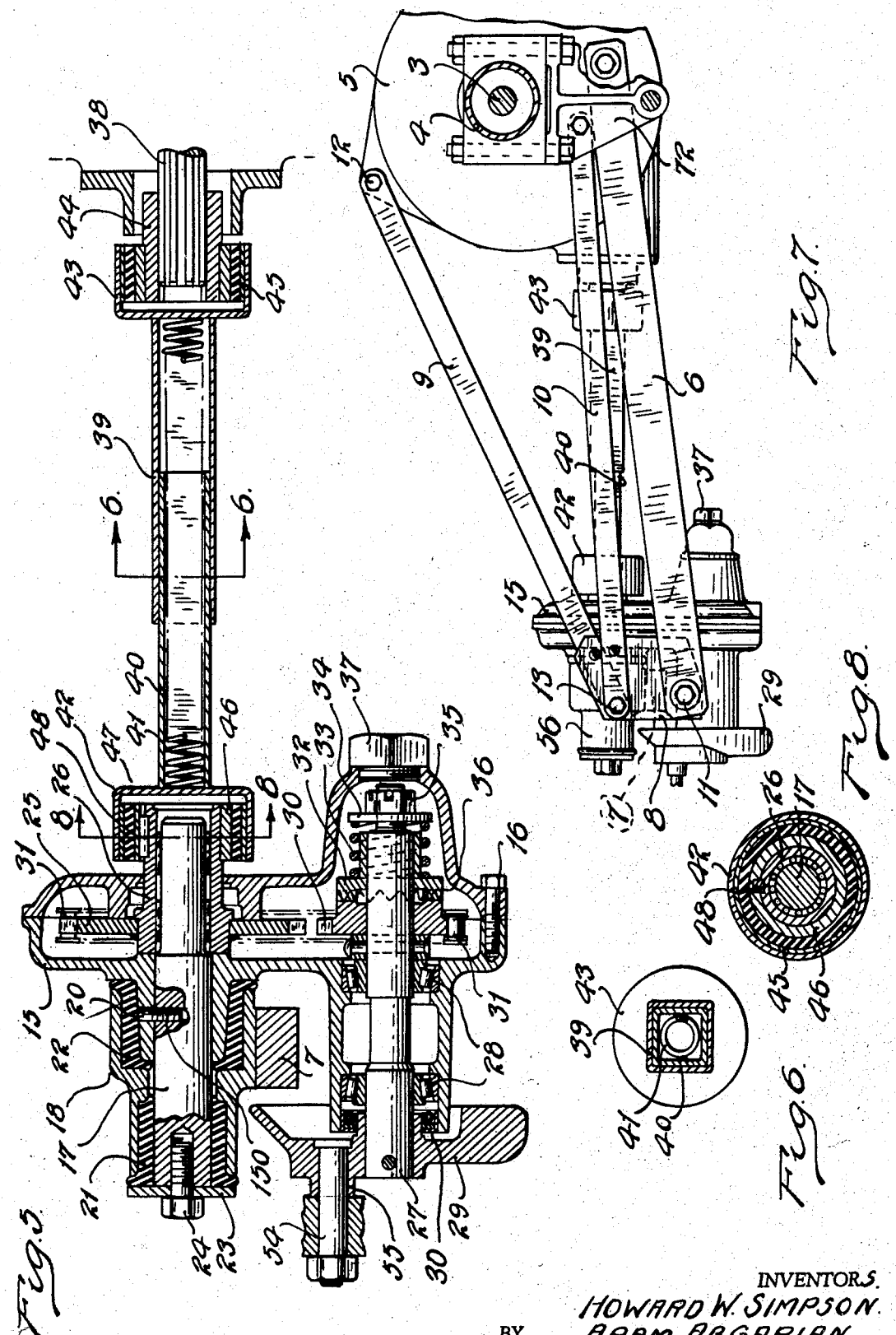
INVENTORS.
HOWARD W. SIMPSON.
ARAM ABGARIAN
BY Barnes, Kisselle, Laughlin & Raisch
ATTORNEYS.

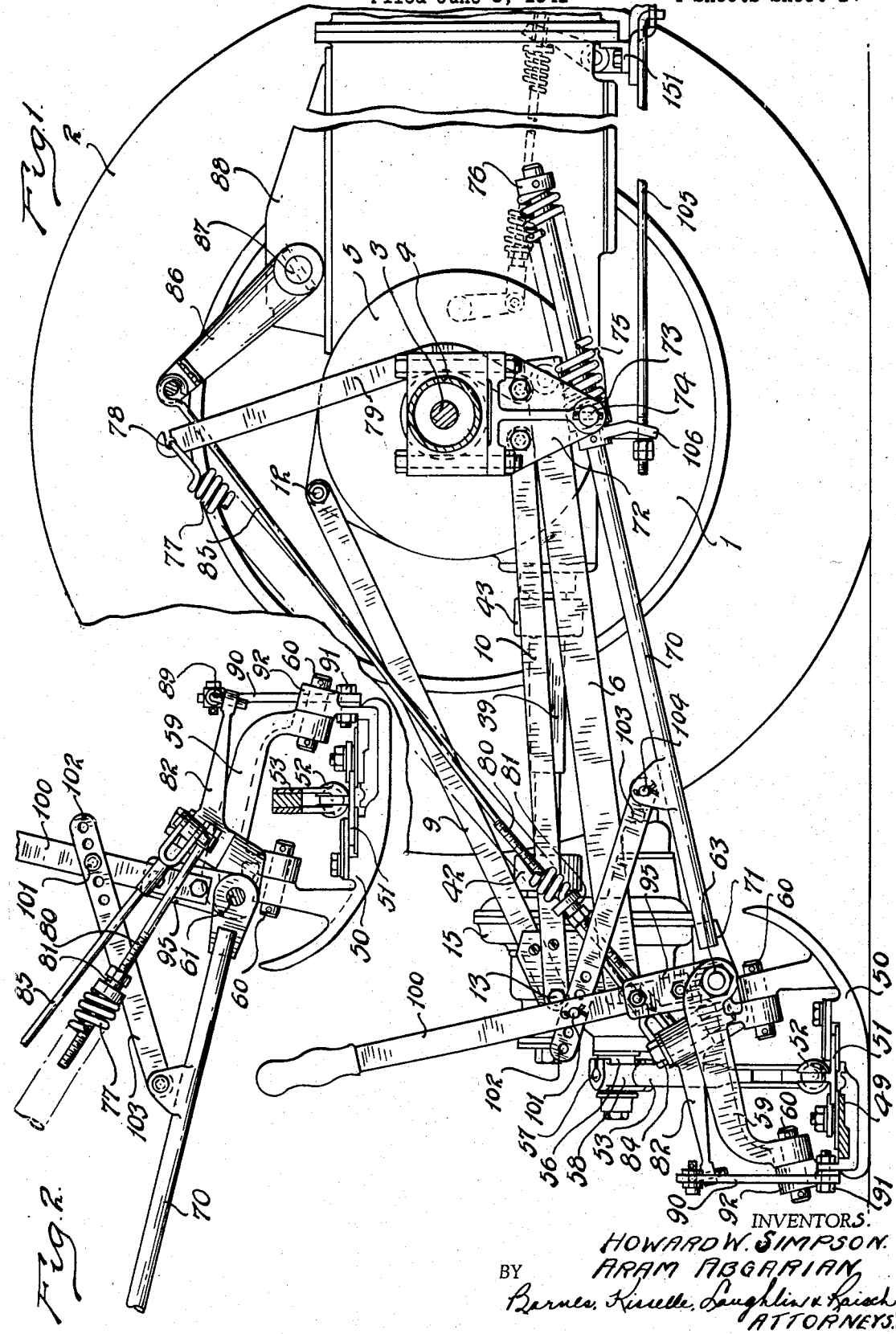

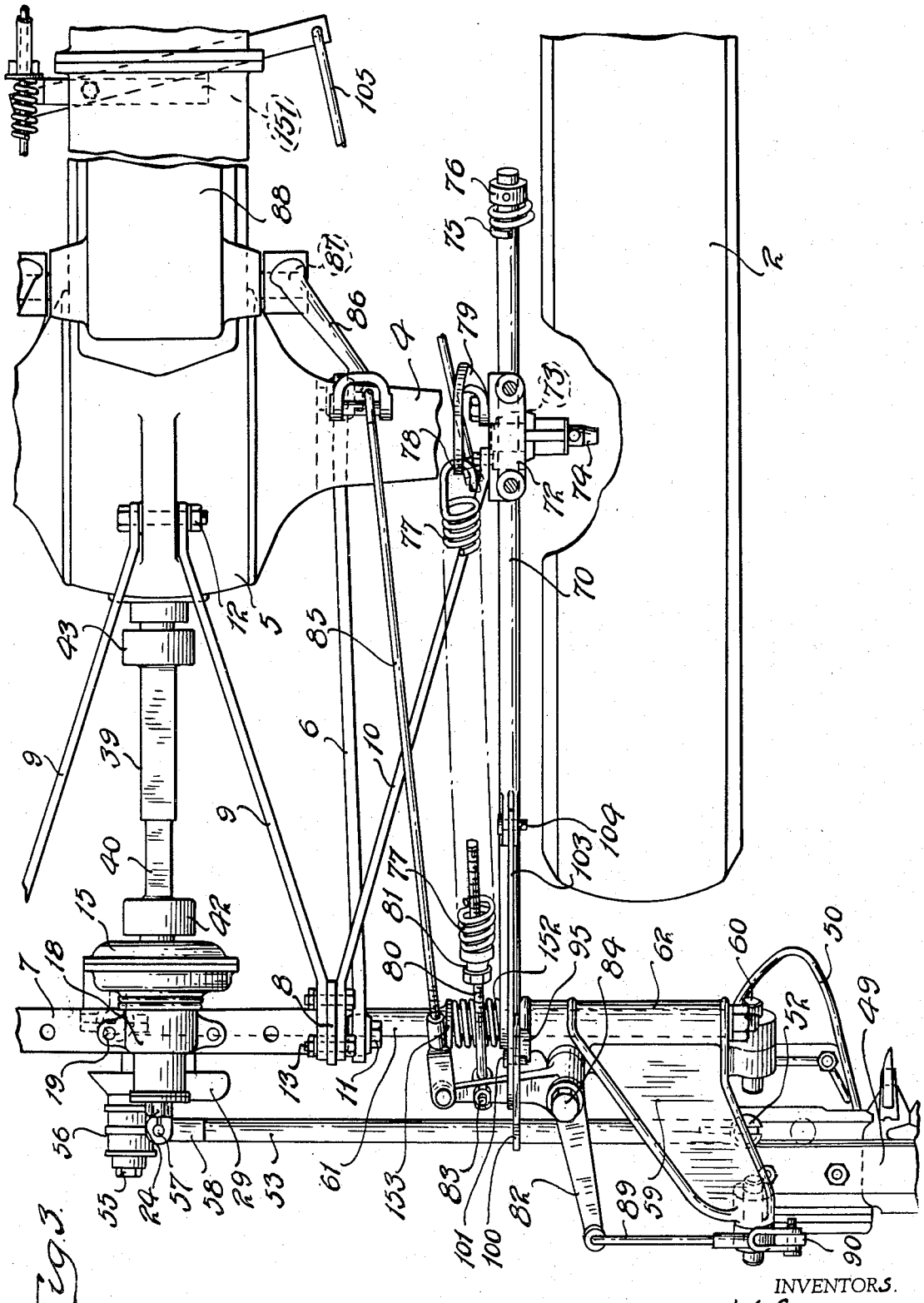

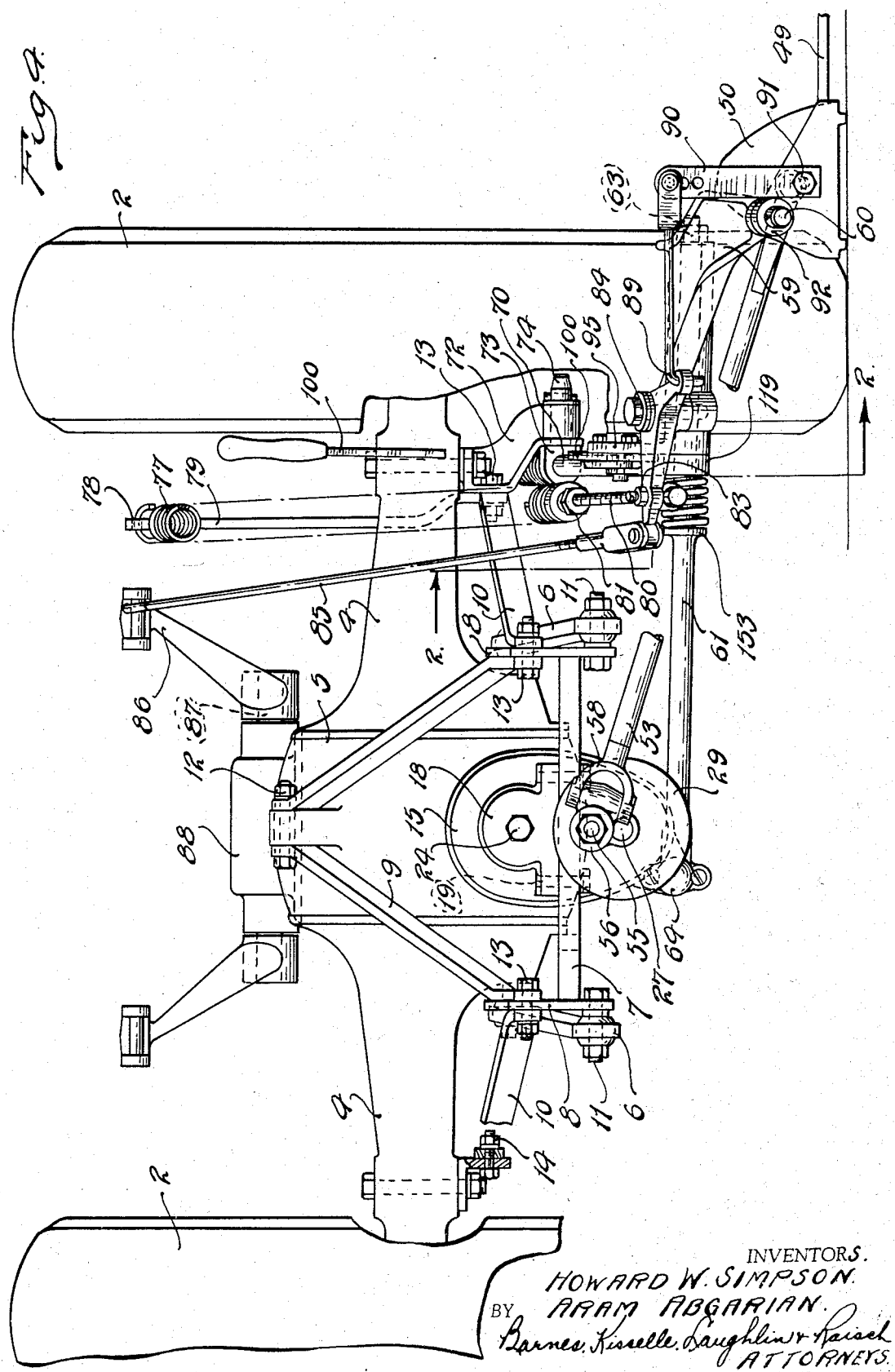

Patented Aug. 1, 1944

2,354,710

UNITED STATES PATENT OFFICE 2,354,710

MOWER FOR TRACTORS

Howard W. Simpson and Aram Abgarian, Detroit, Mich., assignors to Detroit Harvester Company, Detroit, Mich., a corporation of Michigan Application June 9, 1941, Serial No. 397,200

19 Claims. (Cl. 56—264)

This invention relates to a mower for a tractor and more particularly to a rear mounted mower for a tractor.

In a mower for a tractor the sickle weighs several pounds and makes about nine hundred reciprocations or eighteen hundred strokes per minute. The reciprocation of a heavy sickle at such high speeds sets up considerable and severe vibration which is very objectionable. At high sickle speeds the vibration is such that the tractor is subjected to a severe shaking which loosens the parts of the tractor and makes it uncomfortable for the driver. This vibration expresses itself mostly laterally or crosswise of the tractor. The vibration can be cut down by reducing the speed of the sickle. However, the slower the speed at which the sickle is operated the slower the speed at which the tractor can be run and the less acreage that can be cut in any given period of time. If one desires to operate the tractor at a speed of six to eight miles per hour, then the sickle must operate at over nine hundred reciprocations per minute.

It is an object of this invention to produce a light weight, high speed mower for a tractor which operates smoothly and practically free from vibration. This object is achieved by a novel rubber mounting for the sickle drive which damps or dissipates the vibration set up by the sickle and thereby allows the sickle to be operated at a higher speed without harmful effects.

This invention also contemplates a rear mounted mower for a tractor which can be quickly attached and detached.

This invention also contemplates a mower for a tractor in which the drive mechanism will have a longer life compared with the driving units heretofore used. This object is achieved by sealing the drive within a housing and running the same in oil where it cannot be reached by the dirt and dust incurred in the ordinary operation of a mower.

Another feature of the invention is an overload clutch incorporated in the drive mechanism and also mounted within the sealed housing. This overload clutch lets the sickle stop instantly whenever it cuts into an obstruction.

This invention also contemplates a drive mechanism which can be quickly connected to the power shaft of the tractor. This object is achieved by means of a telescopic drive shaft which can be readily slipped over the power take-off shaft of the tractor and drive shaft of the mower drive.

In the drawings:

Fig. 1 is a side elevation partly in section of the mower attached to the tractor.

Fig. 2 is a detail section along the line 2—2 of Fig. 4.

Fig. 3 is a fragmentary top plan view of the mower attached to the tractor.

Fig. 4 is a rear view of the mower and tractor.

Fig. 5 is a vertical longitudinal section through the mower drive mechanism, telescopic drive shaft and power take-off shaft of the tractor.

Fig. 6 is a section along the line 6—6 of Fig. 5.

Fig. 7 is a detail showing the attaching links for connecting the mower to the tractor.

Fig. 8 is a section along the line 8—8 of Fig. 5.

Referring more particularly to the drawings there is shown a portion of a tractor comprising the rear wheel 1, tire 2 mounted on the rear wheel, the driving axle 3, the axle housing 4, the differential and power take-off housing 5.

The tractor comes equipped with two implement arms 6 which are secured at their forward ends by means of studs to the underside of the axle housing. As a support for the driving mechanism of the mower there is provided a cross bar 7 to which is affixed at each end the brackets 8. The rear ends of the implement bars 6 are secured to the brackets 8 by the bolts 11. The cross bar 7 is also supported by a pair of inner bars 9 secured at one end to the housing 5 by a bolt 12 and at the other end to the brackets 8 by bolts 13 and by means of a pair of outer bars 10 likewise secured at one end by bolts 13 to the brackets 8 and at the other end secured by bolts 14 to the underside of the axle housing 4.

The drive mechanism for the mower comprises a housing 15 made in two sections which are secured together in sealed relation by bolts 16. The housing 15 is provided with a hub 20 which is fixed on to a stub shaft 17 by set screw 150. The stub shaft 17 is supported at one end by means of a soft rubber bushing or cylindrical sleeve 21 within a hollow housing 18 secured by bolts 19 to the cross bar 7. The hub 20 is also supported within the housing 18 by means of a soft rubber bushing or sleeve 22. Shaft 17 is retained in the housing 18 by end plate 23 and screw 24. The bushings 21 and 22 are made from soft rubber and are placed under relatively high compression between shaft 17 and housing 18. The bushings 21 and 22 are placed under compression by turning in screw 24. Screw 24 as it is turned in acts through plate 23 to place the bushings in compression. Bushing 21 also extends between end plate 23 and housing 18.

A sprocket 25 having a hub 26 is rotatably supported on shaft 17 within the housing 15. A driven shaft 27 is supported on roller bearings 28 within the lower part of housing 15. A pitman flywheel 29 is supported on shaft 27 without the housing 15. A suitable seal 30 is provided between shaft 27 and housing 15. The seal 30 is positioned in the housing to the left of bearing 28 (Fig. 5) and seals the oil, below referred to, within the housing. A driven sprocket 30 is journalled on shaft 27. A drive chain 31 connects sprockets 25 and 30.

Sprocket 30 does not drive shaft 27 direct but drives the same through a ratchet type clutch. The ratchet clutch comprises a sleeve 32 which is splined on shaft 27 so that it must rotate with shaft 27 but can slide longitudinally thereof. The sleeve 32 is backed up by a compression spring 33 held in position by a washer 34 and nut 35. The sprocket 30 and sleeve 32 are provided with interengaging ratchet teeth 36. The compression of spring 33 can be adjusted by removing cap 37 and turning adjusting nut 35 which increases or decreases the load on ratchet teeth 36 and determines the load at which the ratchet clutch will slip. The housing 15 is filled with oil so that the drive mechanism runs in oil and is always assured of proper lubrication.

Sprocket 25 is driven from the power take-off shaft 38 with which the tractor is provided. The driving connection between shaft 38 and sprocket 25 comprises a telescopic driving shaft made from a pair of non-circular or square tubes 39 and 40, the latter of which is telescoped within the former. A compression spring 41 is housed within the tubes 40 and 39 and tends to separate the same. The telescopic drive shaft has cylindrical cup members 42 and 43 affixed at opposite ends. A coupling sleeve 44 having internal splines is secured within cup member 43 by means of a rubber bushing 45.

Bushing 45 is made from soft rubber and also mounted under compression between sleeve 44 and cup member 43. Sleeve 44 is slipped over the splined power take-off shaft 38 to effect a driving connection between the telescopic shaft and the shaft 38. A sleeve 46 having a key 47 is mounted within cup 42 by a rubber bushing 43 also under compression. Key 47 has a sliding fit in keyway 48 formed in hub 26.

The telescopic drive shaft permits quick assembly to the mower by simply sliding the shaft 40 within shaft 39 and then slipping sleeve 44 over the power take-off shaft 38 and the other end of the shaft over hub 26. Spring 41 keeps the telescopic shaft expanded and in driving relation with the power take-off shaft and the hub 26.

The mower comprises the conventional mower bar 49 fixed at the inner end to the shoe 50 and a reciprocating sickle 51 connected by a ball and socket joint 52 with one end of the pitman 53. The other end of the pitman 53 is connected to the flywheel 29. This connection comprises a pin 54 (Fig. 5) fixed in opening 55 of the flywheel 29. A bearing knuckle 56, Figs. 3 and 4, is journalled on pin 54. Bearing knuckle 56 has a vertical pivotal connection with pitman 53 in the form of a pin 57 and yoke 58. Thus it will be seen that the connection between the pitman 53 and the flywheel 29 is in the form of a universal joint.

The sickle and mower bar are pivotally mounted on hinged bracket 59 by means of pins 60 so that the mower bar and sickle can be swung up to vertical or upright position. Hinged bracket 59 is provided with a sleeve portion 62 which is swiveled upon the outer end of the drag bar 61 and retained thereon by nut 63. The other end of the drag bar 61 has a ball and socket connection 64 with the lower end of the housing 15. It will be noted that the ball and socket connection 64 is positioned very close to the point of connection between the pitman and flywheel 29. This relation is important as explained below.

One end of pull rod 70 is welded or otherwise fixed to the collar 119 as at 71. The other end of the pull rod has a loose sliding fit in collar 73 integral with pin 74 which is journalled beneath the axle housing 4 in bracket 72. Bracket 72 is supported on the housing 4. A compression spring 75 is positioned over pull rod 70 between collar 73 and stop ring 76 on the end of the pull rod. Thus, the rod 70 and collar 73 are free to swivel with pin 74 about a horizontal axis and the loose fit of rod 70 in collar 73 gives the rod somewhat of a universal joint connection with the collar 73 which is essential to avoid binding between the collar and pull rod whenever the mower bar and sickle breaks back, such as occurs when an obstacle is hit.

The weight of the mower mechanism is counterbalanced by balance spring 77. One end of spring 77 is connected as at 78 to bracket 79 above the axle housing 4. Bracket 79 is bolted to bracket 72. The other end of the balance spring 77 is fixed to rod 80 as at 81. Rod 80 is swiveled to bell crank 82 as at 83.

Bell crank 82 is pivotally supported by means of pin 84 on hinged bracket 59. The axis about which bell crank 82 swings, that is, pin 84, extends upwardly and rearwardly, Fig. 1. One end of the bell crank is connected by draft link 85 with lever 86 supported on shaft 87. Shaft 87 is connected to a hydraulic drive (not shown) within housing 88 which serves as a source of power for lifting the mower bar. The other end of the bell crank 82 is connected by means of link 89 with the upper end of a lever 90. The lower end of the lever 90 is pivotally connected to shoe 50 by means of pin 91. Lever 90 abuts against boss 92 of the shoe 50. Shoe 50, as above explained, is pivotally mounted on bracket 59 by means of pins 60.

When it is desired to elevate the mower bar for any reason whatsoever, such as to clear a stump or in case one desires to run the tractor without having the mower in cutting position, the hydraulic lift mechanism is operated which swings lever 86 forwardly or clockwise, Fig. 1, thus moving lift link 85 forwardly which swings bell crank 82 clockwise, Fig. 3, through a few degrees until it strikes lug 95 on hinged bracket 59 which stops further rotation of the bell crank. The swinging of the bell crank through a few degrees acts through lift link 89 and lever 90 to swing the mower bar 49 upwardly about pivot pins 60 a few degrees. Upon further clockwise rotation of the lever 86 and forward movement of lift link 85 with bell crank 82 abutting stop 95, the mower bar 49 and shoe 50 are further elevated together because at this time drag bar 61 swings upwardly about the ball and socket joint 64 and the pull bar 70 swivels upwardly on pin 74 until the shoe and mower bar are raised about a foot off the ground. If it is desired to raise the mower bar to vertical position, the same can be done at any time by manually swinging the same upwardly about pivot pins 60.

The tilt of shoe 50 and mower bar can be adjusted by means of hand lever 100, the lower end of which is affixed to stop 95 on bracket 59. Swinging of lever 100 causes the mower bar and shoe to tilt about drag bar 61. The lever 100 is held in adjusted position by means of pin 101 which passes through one of the adjustment openings 102 in rod 103 pivoted to pull bar 70 at 104.

In case the mower strikes a stump or other obstruction the mower bar swings back against the compression of spring 75. During the break back, drag bar 61 swings about ball and socket joint 64 and pull rod 70 slides in collar 73. Whenever the break back of the mower bar occurs, rod 105 is drawn backwardly by bracket 106 affixed on pull bar 70. As rod 105 moves backwardly it operates through known mechanism, generally designated 151, to disengage the tractor clutch and apply the brake to the left hand wheel.

In case the sickle and mower bar should run into an obstruction, such as a large tree stump, the break back of the mower bar occurs and the sickle continues to reciprocate. However, in case the mower bar should run into an obstruction, such as a steel stake or other object which can get between the fingers of the mower bar and obstruct the sickle, the ratchet overload clutch will immediately disengage and thereby cut out the drive and stop the sickle. In such case the overload clutch comes into action and stops the sickle before the break back of the mower bar stops the tractor.

In the operation of the mower it will be noted that the drive from the power take-off shaft to the sprocket 25 is applied through the telescopic drive shaft. This drive shaft is mounted on rubber in compression. These rubber inserts 43 and 45 in the coupling shaft reduce the shock load on the moving parts of the mower and the wear and tear on the mowing machine by smoothing out load impulses. This gives greater life to the sickle sections and the ledger plates. These rubber inserts also allow for disalignment of the mower chain drive box relative to the tractor power take-off shaft due to any slight manufacturing variations.

The drive through the sprockets 25 and 30 and chain 31 is transmitted through shaft 27 to the pitman 53 which reciprocates the sickle at a very high speed. This sets up considerable vibration mostly crosswise or laterally of the tractor. These vibrations are transmitted through the drag bar 61 and the pitman to the mower chain drive box or housing 15. This causes the housing 15 to vibrate or swing about shaft 17 supported in the rubber bushings 21 and 22. These bushings 21 and 22 are in compression and during the vibration of the housing 15 are also in torsion when housing swings sideways of the tractor such as occurs when the mower is operating. These rubber bushings effectively damp and dissipate substantially all of the vibration set up by the sickle, pitman, and other moving parts of the mower. Inasmuch as the entire chain drive housing 15 is hung in rubber to damp and practically eliminate the vibration in the mower which would otherwise be transmitted to the tractor, the sickle can be operated at a much higher speed with the result that greater acreage can be mowed. With a mower having the above described rubber mounting, a sickle has been run at a speed as high as twenty-two hundred strokes per minute. At this sickle speed the mower operates extremely smoothly and the vibration is practically nil.

A further beneficial result of the rubber mounting of the housing 15 and of the rubber inserts in the telescopic drive shaft is that the whole mower can be made much lighter because of lower stresses.

The tractor even with the mower attached can be used for drawing other implements. These other drawn implements can be readily attached to the cross bar 7 in holes provided therefor for hauling the same. This feature of the mower is obtained by having the driving mechanism of the mower all located ahead of the cross bar 7.

The telescopic drive shaft is important because it can be assembled after the rest of the mower has been completely mounted on the tractor. This facilitates the quick assembly of the mower to the tractor. It should also be noted that in the break back of the mower bar the housing 15 and drive assembly, as well as the coupling shaft, are not moved except for the side deflection of case 15 in the rubber. This is made possible by the fact that the vertical pivot of the pitman arm and the vertical pivot pin 57 and the ball and socket pivot 64 of the drag bar are located close together. This permits both the pitman 53 and the drag bar 61 to swing backwardly on approximately the same radius without causing them to bind. This mounting of the vertical pivot 57 of the pitman arm and the ball and socket 64 of the drag bar 61 close together is also important because it permits the mower bar and sickle to rise and fall as it passes over the ground while mowing without causing the sickle to be displaced lengthwise appreciably in relation to the mower bar. In other words, each sickle section will always make a complete reciprocation from one ledger plate to the next which is highly desirable for efficient cutting even though the mower bar and shoe 50 rises and falls with respect to the tractor.

The balance spring 77 reduces the wear of the shoe and mower bar against the ground and also prevents the mower bar from digging into the ground. This spring balance arrangement gives a floating action which allows the mower bar to ride lightly through the crop with a minimum of power.

Referring to Fig. 3 it will be noted that the drag bar makes an angle of ninety degrees with the longitudinal center line of the tractor and that the pull bar 70 makes an angle of about ninety degrees with the drag bar 61. This feature is important because if the pull bar 70 is positioned other than a right angle with drag bar 61 in the operation of the mower, the pull bar will tend to straighten out or swing into a position in which it is parallel to the longitudinal axis of the tractor. In so doing, the mower bar 49 will swing backward about the drag bar and ball and socket joint. For efficient cutting it is very desirable that the mower bar and sickle should be positioned perpendicularly to the direction of travel of the tractor, that is, the mower bar should make a right angle with the longitudinal axis of the tractor. This is achieved by arranging the pull bar 70 so that it makes a right angle with the drag bar 61.

The mower bar and shoe are pivoted to the hinged bracket 59 about an axis which is inclined forwardly and upwardly. The axis 60—60 is tilted forwardly and upwardly to prevent the tendency for the shoe or inner end of the mower bar to raise, particularly under hard cutting conditions or when the outer end of the mower bar hits an obstacle.

As shown in Figs. 3 and 4, compression coil spring 152 is mounted over the drag bar 61 between shoulder 153 integral with the drag bar 61 and collar 119. Hinged bracket 59 is maintained on drag bar 61 by means of nut 63. It will be seen that this mounting of the hinged bracket on the drag bar provides a very simple arrangement for adjusting the mower or finger bar with respect to the sickle to obtain proper register of the sickle with the finger bar. By simply tightening or loosening nut 63 the finger bar and sickle can be brought into the proper register.

We claim:

1. In a mowing machine, the combination with an oscillating sickle and pitman for oscillating the sickle, of driving mechanism for said pitman, a connection between said driving mechanism and said pitman, and a mounting for said driving mechanism of distortable elastic material in compression and also in torsion when the pitman is oscillating for damping the vibration of the oscillating sickle and pitman.

2. In a mowing machine, the combination with an oscillating sickle and pitman for oscillating the sickle, of a driving mechanism for said pitman, a connection between said driving mechanism and said pitman, a rigid fixed support, and a mounting of distortable elastic material in compression and also in torsion when the sickle and pitman are oscillating for floating the driving mechanism on the support whereby the vibration of the oscillating sickle and pitman is damped.

3. In a mowing machine, the combination with an oscillating sickle and pitman for oscillating the sickle, of a driving mechanism for said pitman, a connection between said driving mechanism and said pitman, a support for said driving mechanism, a rigid fixed support for said first mentioned support, and a pivotal mounting including a member of elastic material for floating said first mentioned support on said rigid support whereby the vibration of the oscillating sickle and pitman are damped.

4. In a mowing machine, the combination with an oscillating sickle and pitman for oscillating the sickle, of a driving transmission for said pitman, a connection between said driving transmission and said pitman, a housing for said driving transmission, a rigid support, and a rubber mounting in compression and in torsion when the sickle and pitman are oscillating for floating said housing on said rigid support whereby the vibration of the oscillating sickle and pitman are damped.

5. In a mowing machine, the combination with an oscillating sickle and pitman, of a driving mechanism, a connection between said driving mechanism and said pitman, a support for said driving mechanism, a second support member, and a mounting including a shaft fixed to one of said aforementioned members and distortable elastic material carried by the other member and supporting said shaft in said other member for floating the driving mechanism support on the said second support, the said distortable elastic material being in compression at all times and also in torsion when the driving mechanism is running whereby the elastic support damps the vibration of the oscillating sickle and pitman.

6. In a mowing machine, the combination with an oscillating sickle and pitman, of a drving mechanism, a connection between said driving mechanism and said pitman, a housing for said driving mechanism, a support member, and a mounting of distortable elastic material for floating the housing on the said support, the said distortable elastic material being in compression at all times and also in torsion when the driving mechanism is running whereby the elastic support damps the vibration of the oscillating sickle and pitman.

7. In a mowing machine, the combination with an oscillating sickle and pitman for oscillating the sickle, of a driving mechanism for said pitman, a connection between said driving mechanism and said pitman, a housing for said driving mechanism, a stub shaft for suppprting said housing, and a distortable elastic support for said stub shaft, the said distortable elastic support being in compression and also in torsion when the sickle and pitman are oscillating.

8. In a mowing machine, the combination with an oscillating sickle and pitman for oscillating the sickle, of a driving mechanism for said pitman, a connection between said driving mechanism and said pitman, a rigid support, a shaft supporting said driving mechanism, and rubber bushings in compression for mounting said shaft on said rigid support whereby the bushing is also in torsion when the sickle and pitman are oscillating and functions to dampen the vibration of the oscillating sickle and pitman.

9. In a mowing machine, the combination with an oscillating sickle and pitman, of driving mechanism for the same, said driving mechanism including a pair of sprockets, a chain running over the sprockets, and a driven shaft connected to the said pitman, a housing inclosing the driving mechanism, a rigid support, and a mounting of distortable elastic material in compression for mounting the housing on the said rigid support whereby the elastic mounting is also in torsion when the sickle and pitman are oscillating and functions to dampen the vibration.

10. In combination with a tractor having a rigid support, a mowing machine including an oscillating sickle and pitman for oscillating the sickle, driving transmission for said pitman, a connection between said driving transmission and said pitman, and a mounting of distortable elastic material for supporting said driving transmission upon the rigid support of the tractor, said elastic mounting being in compression and also in torsion when the oscillating sickle and pitman are oscillating whereby the vibration is damped.

11. In combination with a tractor having a rigid support, a mowing machine including an oscillating sickle and pitman for oscillating the sickle, driving mechanism for said pitman, a connection between said driving mechanism and said pitman, and a mounting of distortable elastic material for supporting said driving mechanism upon the rigid support of the tractor, said elastic mounting being in compression and also in torsion when the oscillating part is oscillating whereby the vibration is damped, and a power take-off shaft for said tractor, and a shaft mounted in rubber for connecting the power take-off shaft with said driving mechanism.

12. In combination with a tractor having a rigid support, a mowing machine including an oscillating part, driving mechanism for said part, and a mounting of distortable elastic material for suporting said driving mechanism upon the rigid support of the tractor, said elastic mounting being in compression and also in torsion when the oscillating part is oscillating whereby the vibration is damped, said tractor having a power take-off shaft, said driving mechanism including a rotary member having a portion projecting without the housing, a telescopic drive shaft adapted to be slipped over the power take-off shaft and said other shaft for connecting the power take-off shaft with the driving mechanism for the mower.

13. In combination with a tractor having a rigid suport, a mowing machine including an oscillating part, driving mechanism for said part, and a mounting of distortable elastic material for supporting said driving mechanism upon the rigid support of the tractor, said elastic mounting being in compression and also in torsion when the oscillating part is oscillating whereby the vibration is damped, said tractor having a power take-off shaft, said driving mechanism including a rotary member having a portion projecting without the housing, a telescopic drive shaft adapted to be slipped over the power take-off shaft and said other shaft for connecting the power take-off shaft with the driving mechanism for the mower, and a rubber mounting for each end of the telescopic shaft whereby the same is floated in rubber and serves to smooth out load impulses.

14. In combination with a tractor having a rigid support, a mowing machine including an oscillating sickle and pitman for oscillating the sickle, a driving mechanism for said pitman, a mounting of distortable elastic material for mounting the driving mechanism on said rigid support, and a drag bar also having one end connected to said rigid support by means of said mounting of distortable elastic material whereby the vibration of the oscillating sickle and pitman is damped.

15. In a mowing machine, the combination with an oscillating sickle and pitman for oscillating the sickle, of a driving mechanism for said pitman, a housing for said driving mechanism, a connection between the driving mechanism and pitman a rigid support, a mounting of distortable elastic material in compression for mounting the housing on the support, a drag bar, and a pivotal connection between one end of the drag bar and the said housing whereby the distortable elastic material dampens the vibration set up in the operation of the mower.

16. In a mowing machine, the combination of a sickle, a mower bar for the sickle, a pitman, and a driving mechanism for the pitman including a rotating flywheel, a support for the driving mechanism floated in distortable elastic material held in compression, and a drag bar pivotally connected at one end to the support adjacent the connection between the pitman and the pitman flywheel whereby the mower sickle and mower bar can be elevated without causing the sickle to become displaced lengthwise appreciably in relation to the mower bar, and a pivotal connection between the other end of the drag bar and the mower bar.

17. In a mowing machine, the combination with an oscillating sickle and pitman for oscillating the sickle, of driving mechanism for said pitman, a connection between said driving mechanism and said pitman, a housing for said driving mechanism, a rigid support, a pivotal mounting for the housing on the rigid support, and resilient means acting between the housing and the support for damping the vibration of the oscillating sickle and pitman.

18. In a mowing machine, the combination with an oscillating sickle and pitman, of a driving mechanism, a housing for said driving mechanism, a flywheel mounted on said housing and connected to one end of the pitman, a support, a pivotal mounting for the housing on the said support, and resilient elastic means acting between the housing and the said support for damping the vibration created by the oscillating sickle and pitman.

19. In a mowing machine, the combination with an oscillating sickle and pitman for oscillating the sickle, of a driving mechanism for said pitman, a connection between said driving mechanism and said pitman, a housing for said driving mechanism, a flywheel mounted on said housing and connected to said pitman, a rigid support, means including a rubber bushing for swingably mounting said housing on said rigid support whereby the bushing is also in torsion when the sickle and pitman are oscillating and functions to dampen the vibration of the oscillating part.

HOWARD W. SIMPSON.
ARAM ABGARIAN.